United States Patent [19]

Sanders et al.

[11] Patent Number: 4,643,355
[45] Date of Patent: Feb. 17, 1987

[54] METHOD AND APPARATUS FOR MODIFICATION OF CLIMATIC CONDITIONS

[75] Inventors: Ernest D. Sanders, Morrinsville; Lawrence D. Sanders; Nigel D. Sanders, both of Auckland, all of New Zealand

[73] Assignee: Development Finance Corporation of New Zealand, Wellington, New Zealand

[21] Appl. No.: 808,380

[22] Filed: Dec. 16, 1985

Related U.S. Application Data

[63] Continuation of Ser. No. 576,420, Feb. 2, 1984, abandoned.

[30] Foreign Application Priority Data

Feb. 2, 1983 [NZ] New Zealand ................ 203159

[51] Int. Cl.$^4$ .............................................. A01G 15/00
[52] U.S. Cl. ................................... 239/2.1; 239/418; 239/590.5; 239/14.1; 261/30; 261/83; 261/116; 47/2
[58] Field of Search ............ 239/2 R, 14, 214, 214.11, 239/498, 502, 513, 587, 590.5, 418, 423, 77, 78, 225, 264; 261/116, 30, 83; 47/2

[56] References Cited

U.S. PATENT DOCUMENTS

| | | | |
|---|---|---|---|
| 2,220,082 | 11/1940 | Daugherty | 239/513 |
| 2,358,318 | 9/1944 | Daugherty | 239/78 |
| 2,712,714 | 7/1955 | McGee | 47/2 |
| 2,736,605 | 2/1956 | Spreny | 239/78 |
| 2,925,222 | 2/1960 | Spreng | 239/78 |
| 2,938,672 | 5/1960 | Glatfelter | 239/77 |
| 3,243,890 | 4/1966 | Easterday | 239/2 R |
| 3,306,533 | 2/1967 | Vertrees et al. | 47/2 X |
| 3,788,542 | 1/1974 | Mee | 239/2 R |
| 3,904,128 | 9/1975 | Primault | 239/587 |
| 3,964,465 | 6/1976 | Diggs | 47/2 X |
| 4,004,732 | 1/1977 | Hanson | 239/14 X |
| 4,039,144 | 8/1977 | Mee | 239/2 R |

FOREIGN PATENT DOCUMENTS

| | | | |
|---|---|---|---|
| 10046 | 1/1924 | India | 239/14 |
| 661254 | 11/1951 | United Kingdom | 239/77 |

*Primary Examiner*—Andres Kashnikow
*Assistant Examiner*—Mary Beth O. Jones
*Attorney, Agent, or Firm*—Holman & Stern

[57] ABSTRACT

A fog generator comprises a duct which is preferably vertical and very tall, an air mover for moving air down through the duct, an air director which includes a spout to direct the air emerging from the duct in a substantially horizontal stream in a chosen direction away from the duct and a fog generator which generates a fog into the moving air preferably after the air has left the spout. The spout is preferably rotatable in a horizontal plane. The invention enables a generated fog to be placed where required by the air stream in which it is entrained rather than relying on natural wind drift.

17 Claims, 2 Drawing Figures

METHOD AND APPARATUS FOR MODIFICATION OF CLIMATIC CONDITIONS

This is a continuation of application Ser. No. 576,420, filed 02/02/84, now abandoned.

BACKGROUND OF THE INVENTION

1. Field of the Invention

This invention relates to a method and apparatus for the modification of climatic conditions by the generation and controlled dispersal of a fog, i.e. fine water droplets suspended in the air.

2. Description of the Prior Art

Artificially created fogs are useful to control climatic conditions in and above foliage in several situations. For example on a hot, dry, still day a fog generated and directed over an area of foliage will cool and humidify the ambient air and in so doing can reduce fruit scorch for instance. Also in hot weather the uptake of water by roots sometimes cannot keep pace with the loss of water from the leaves. An artificial fog or mist can provide foliar irrigation and reduce stress on the plant, tree etc.

However, probably the greatest economic need for modification of climatic conditions is the need to create artificial fogs to counter the effects of radiation frosts where the foliage temperature can plunge below 32 degrees Fahrenheit causing freeze damage to the foliage at a temperature dependent on the particular crop, plant, tree etc.

In U.S. Pat. No. 4,039,144 filed by Thomas R. Mee, assignor to Mee Industries Inc. a method of artificially generating a fog and a considerable amount of the theory behind frost control is discussed. It will be assumed the reader of this specification is familiar with the contents of that patent specification.

Very briefly, U.S. Pat. No. 4,039,144 relates to the generation of a fog at a pre-selected location or locations and wind drift is utilized to convey the fog into and over the foliage to be protected. Difficulties have been experienced with this arrangement firstly because in many geographical locations wind drift is not predictable and secondly because the depth of the fog layer which is economically achieved is insufficient to provide the degree of radiation protection desirable because the cost of generating the fog at a sufficiently large height above the foliage is too high.

Therefore, the prior art discloses methods and apparatus for fog generation but none provides acceptable control of the position of the fog generated.

BRIEF SUMMARY OF THE INVENTION

The present invention in a first aspect consists in a fog generator comprising a duct, an air mover to move air through the duct, air directing means to direct the air emerging from the duct in a substantially horizontal stream in a chosen direction away from the duct and a fog generating means which generates a fog into the moving air.

The phrase "substantially horizontal" is used in this specification in a rather loose sense. In practice there is no point in directing the fog into the ground and neither would any useful purpose usually be achieved by directing the fog in a manner more nearly vertical than horizontal because one of the aims will usually be to spread the fog over a considerable area as well as providing a sufficient height of fog. Factors such as air drifts and the slope of the ground on which the apparatus is installed however will mean that the angle at which the fog is to be propelled may vary from one location to the next and thus the phrase substantially horizontal is intended to envisage situations where there is an appreciable upwards component of travel of the fog as well as horizontal. Similarly the phrase "substantially vertical" may sometimes mean at 90 degrees to substantially horizontal.

In a second aspect the present invention consists in a method of modifying climatic conditions comprising continuously moving air through a duct, directing the moving air in a stream in a substantially horizontal direction away from the duct and continuously generating a fog into the moving air at a location before or after the air has been finally directed in a substantially horizontal direction.

BRIEF DESCRIPTION OF THE DRAWINGS

A preferred form of the method and apparatus of the invention will be described with reference to the accompanying drawings wherein.

DETAILED DESCRIPTION OF THE PREFERRED EMBODIMENT

Figure 1:
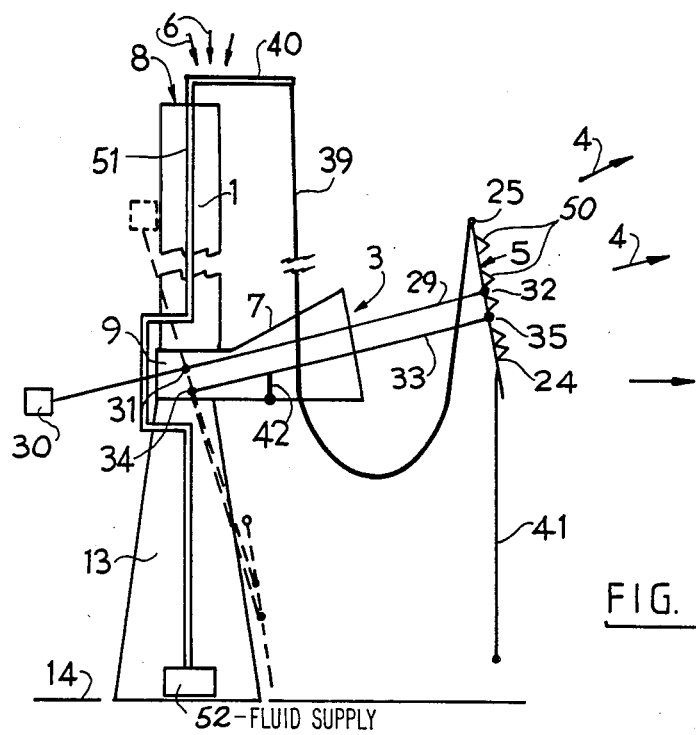
FIG. 1 is a schematic elevational view of a fog generator according to this invention.

The fog generator apparatus of the present invention is generally shown in a preferred form in FIG. 1. The apparatus comprises a duct 1, an air mover 2 (FIG. 2) to move air through the duct, air directing means 3 to direct the air emerging from the duct in a substantially horizontal stream in a chosen direction away from the duct as shown by the arrows 4, and a fog generating means 5 which generates a fog into the moving air. The air directing means 3 and hence the emergent air stream is rotatable with respect to the ground, and is preferably rotatable with respect to the duct 1, in a substantially horizontal plane through at least a sector of a circle so that fog can be dispersed in more than one direction and preferably is rotatable through 360 degrees. This is most easily effected if the axis of at least a portion of the duct 1 is substantially vertical and preferably the whole duct is substantially vertical and is located above the air directing means and has an inlet 8 at its upper end of such a height to ensure that incoming air, indicated by arrows 6, is substantially drawn from any inversion layer present (which of course will vary from one locality to another as to its presence and height. There are also seasonal affects which influence the existence and position of the inversion layer.)

Figure 2:
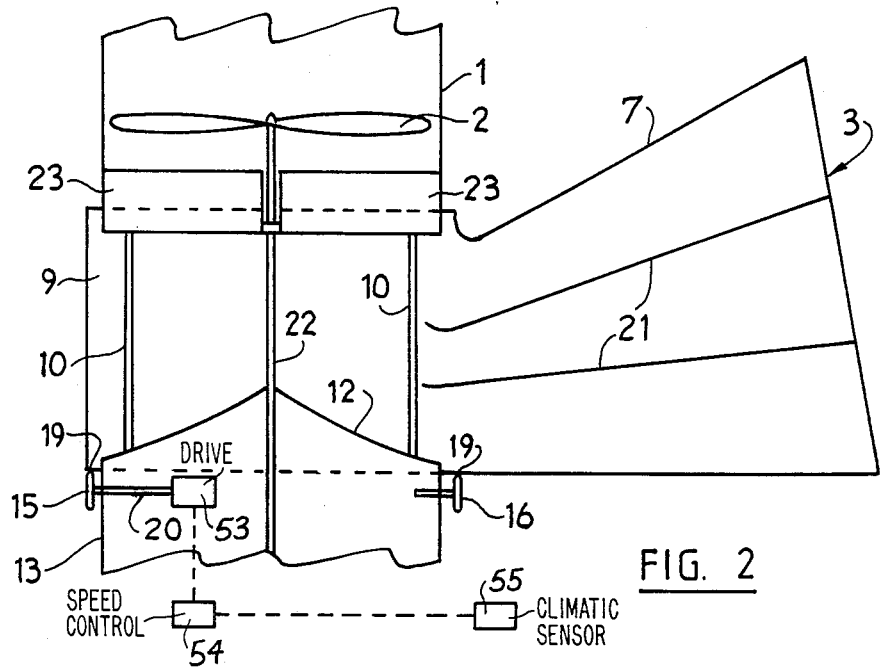
FIG. 2 is a schematic partial vertical cross sectional view taken along the axis of the fog generator showing the air directing means.

The air directing means 3 includes an outlet spout 7 which is substantially horizontal but is preferably flared upwardly to allow an upward direction to be given to the emergent air. The cross section of the spout 7 would be rectangular. The spout communicates with, and may be integral with, a substantially vertical tubular portion 9 which surrounds the lower end of the duct 1. As can be seen in FIG. 2, duct supporting means 10 pass up the interior of the tubular portion 9 to support the duct 1 in a manner allowing air to flow through the duct through the tubular portion 9 and into the outlet spout 7. Athough only two duct supporting means are illustrated in FIG. 2, in practice there would usually be a greater number to give the required stability to the duct 1. A substantially conical air deflector 12 concentric with the axis of the duct 1 forms a base closure of the tubular portion 9 but is not part of the tubular portion as it is fixed to the base 13 which supports the duct and air directing means a suitable height from ground level 14.

Rotation of the air directing means is preferably achieved by supporting it on a plurality of wheels such as 15 and 16 which run on a track 19. Control means 53, 54 shown in the drawings schematically are preferably provided to control the rate of rotation of the air directing means, preferably in a manner which allows for variation of the rate of rotation. Typically the control means 53, 54 would control the rate of rotation of the axle 20 of the drive wheel 15. In practice, the rate of rotation will depend on climatic conditions and the need to disperse greater volumes of fog in some directions than in others, for example to counter a wind drift. The control means would preferably include sensors 55 to monitor climatic conditions at positions remote from the fog generator in the volume (such as an orchard confined by wind breaks) to be treated with fog.

The spout 7 of the air directing means also includes a plurality of spaced substantially horizontal plates 21 to divide and direct the moving air in a stream in the required substantially horizontal direction. Plates 21 are preferably adjustable as to their inclination to the horizontal.

It will be appreciated that as the air directing means is rotatable through 360 degrees around the duct 1 the substantially conical air deflector 12 also assists the smooth passage of air from the duct into the spout regardless of the orientation of the spout with respect to the duct.

The air mover 2, which preferably comprises a propeller fan preferably located at the base of the duct so the duct need not be strengthened to support it, is driven by a shaft 22 which preferably passes through the center of the substantially conical air deflector 12 into the base 13 which is preferably constructed as a room housing a drive motor (not shown) for the fan shaft 22 as this motor would frequently need to be of large power output and therefore size depending on the size of the fog generator and the volume of air it is capable of moving. Such a room can also conveniently house the control means which will preferably be electrical and any pumping or filtration apparatus needed. A plurality of stator blades 23, downstream of the fan, help to remove rotation imparted to the moving air mass as it passes through the fan.

The fog generating means 5 comprises a bank or grid 24 of spray nozzles shown schematically at 50 fed from water pipes (not shown in detail) connected to a manifold 25 supplied with suitably clean water under a suitably high pressure. The spray nozzles are of a suitable size to provide a mist or fog of the required range of droplet sizes to which the fog generator is to be put. It is well known that large droplets fall to the ground quicker than small droplets, and it is also well known that the effectiveness of a fog blanket for reflecting radiant heat, which would otherwise be lost by radiation from foliage to the sky, is dependent on drop size. Large drop sizes can be used with the apparatus of this invention since as the fog is dispersed by the air stream to where it is required, the need for it to have a high degree of buoyancy so that it persists for a sufficiently long time to be distributed where needed by natural wind drift, as in previously mentioned U.S. Pat. No. 4,039,144, is eliminated. This is a considerable advantage since it is always difficult and expensive to filter large volumes of water to the required degree to prevent or substantially eliminate spray jet blockage and of course the wider the jet orifice the less the chance of a blockage occurring.

The fog generating means is preferably located so that it generates fog into the air stream which has emerged from the air directing means 3, i.e. after the air has finally been directed in a substantially horizontal direction. As the air directing means is preferably rotatable it is convenient to connect the fog generating means to it.

The distance of the grid 24, from the spout 7, may need to be appreciable depending upon the number of spray nozzles which are in the grid. The spray nozzles require a sufficient spacing so that each fan or cone of water droplets produced does not unduly impinge on the fan or cone of neighboring spray nozzles. Typically a spacing of about 10 centimeters between spray nozzles would be adequate. The spray nozzles preferably generate fog in the direction of the air stream.

It can be desirable to introduce air under pressure into the water to be supplied to the fog generating means. Pressurized air will expand many times on emergence from a spray nozzle and the explosive effect created assists in dispersing the water into fine droplets. This technique enables larger jet sizes to achieve smaller than usual droplet sizes which is an appreciable advantage. Air may be introduced under pressure by either allowing a controlled air leak on the inlet side of the water pump which will usually be used to feed the fog generating means or introducing air from a pressurized source on the outlet side of the pump.

If a large volume is to be treated with fog then the grid would need to be sufficiently large to accommodate the numbers of nozzles needed to generate fog at the required rate. This will determine the spacing of the grid 24 from the spout 7 so that the whole of the grid is washed by the air stream. As this distance can be appreciable, means of substantially counterbalancing the torque in a vertical plane exerted by the fog generating means about the air directing means 3, to which it is secured, is preferable. As shown in FIG. 1 the grid 24 may be attached by an arm 29 to the air directing means and the arm 29 may have, at the end opposite to that of the grid, a counterbalance weight 30 which could be a water filled tank or some other weight. A fillable tank has some advantages in that it can be filled and emptied easily to alter its weight.

It is preferred that the arm 29 be pivoted at 31 to the air directing means 3 so that the grid 24 can be swung downwardly for maintenance and for storage when the fog generator is not being used. Preferably the arm 29 is also pivoted to the grid at 32 and a lower arm 33 is provided pivoted to the air directing means at 34 and to the grid at 35 so that a parallelogram linkage is formed so that the grid 24 is held substantially vertical in both raised position and the lowered position shown in the dashed lines in FIG. 1. There is preferably a pair of arms 29 and 33, one pair on each side of the grid 24 and air directing means 3, but as FIG. 1 is a schematic elevational view, only one of each pair of arms can be seen.

The water manifold is preferably connected via a flexible hose 39 of sufficient length to a rotary coupling 40 located at the top of the duct 1 and supplied with water via a suitable pipeline 51 which will usually run down the inside of the duct 1 to a supply 52 at the base. A wire, rope or chain 41 can hang down from the grid 24 to enable it to be pulled to the downward position and a flexible strap 42, slung between a pair of arms 33 to bear against the bottom of the spout 7, will control the upward position of the grid 24 on the assumption that the counterbalance weight 30 exerts a greater torque about the pivot 31 than does the grid 24 and its associated parts.

The precise dimensions of the fog generator would vary depending upon the use to which it was to be put. However, in the control of freeze damage in a typical orchard situation the air directing means would be at least 16 feet above ground level and the inlet 8 of the duct 1 at least 36 feet above ground level. At such a height the upper end of the duct 1 either penetrates into the inversion layer or air drawn into the duct is substantially from the inversion layer in practice. It is to be expected that to some extent a rotation of the air mass will occur because of the artificial wind created by the fog generator and this wind would perhaps carry down air from the inversion layer into the duct even if the duct did not reach the layer. If air from the inversion layer is able to be utilized this can advantageously increase the buoyancy of the generated fog. Even when there is no inversion layer present the elevated intake of the duct is advantageous since it eliminates or minimizes the entry of fog into the duct and enables the air stream to be directed away from the duct without difficulty. Fog entering the duct can cause icing. Nevertheless, in its broadest aspect the invention is seen as including installations where the duct may not be vertical or of any great length. It is advantageous to suck the air through the duct where the duct is vertical because then the fan can be located at the base of the duct and therefore closer to the fan motor. The duct can be of lighter construction too.

In the prevention of freezing of foliage because of radiation frost it will usually be found that a layer of fog having a depth of at least 130 feet will be needed to ensure that sufficient water is suspended in the air above the foliage to radiate back a major portion of the radiant energy which would otherwise be lost into the sky. Naturally in the design of a fog generator for any given location regard must be had of wind forces on the structure and the whole structure must be designed to resist these. It is of course relatively easy to introduce chemicals into the moving air stream through suitable spray jets and to use heated water or to heat the air passing through.

The fog generator shown in the drawings and described in this specification has the advantage that it is quiet in operation (compared to a wind machine), is a cheap means of freeze protection and relatively cheap to install, if it is electrically driven it is pollution free and it can operate without supervision. It requires a minimal amount of water compared with methods of freeze control using irrigation. It can effectively disperse fog droplets of relatively large size which are more transparent than smaller particles enabling a fog to be generated even in areas where it will drift across roadways and would otherwise create a traffic hazard if the droplet size were too small. It is also capable of entraining a considerable weight of water into the moving air in those situations where this is required, e.g. where a high water precipitation from the fog is needed for irrigation purposes. By controlling the rate of rotation of the air directing means the fog can be driven substantially as far as required. A slow rate forces the fog further from the fog generator. This feature can be used so that odd shaped volumes are filled with fog. In contrast to a wind machine which is restricted by shelter belts this invention enables fog to be directed over shelter. The air stream from the fog generator also provides a pressurized zone tending to restrict the penetration of cold air into the region. By confining the energy of the air mover to a stream of emergent air the fog can be directed where required in distinction to prior art fog generators reliant on wind drift.

What we claim is:

1. A fog generator comprising:

a substantially vertical duct having upper and lower ends;

an air moving means cooperatively associated with said duct to displace air through said duct;

air directing means rotatably mounted adjacent the lower end of said duct for rotational movement relative to said duct in a substantially horizontal plane, said air directing means having an outlet end to direct an air stream generated by said air moving means substantially horizontally away from said duct; and a fog generating means comprising, nozzle support means disposed in spaced relationship from the outlet end of said air directing means, a plurality of nozzles mounted on said nozzle support means and spaced downstream from said outlet end of said air directing means to lie within said substantially horizontal air stream, and fluid supply means operatively connected to said nozzles to supply a fluid to said nozzles, so that the fluid emitted from said nozzles combines with said substantially horizontal air stream to form a substantially horizontal fog blanket.

2. A fog generator as claimed in claim 1 wherein said nozzles are fed via a flexible hose which is connected via rotatable coupling to said fluid supply means.

3. A fog generator as claimed in claim 1 wherein said air directing means comprises an outlet spout which is substantially horizontal and a plurality of spaced, substantially horizontal, adjustable plates to divide and direct the moving air.

4. A fog generator as claimed in claim 1 and further comprising:

an enclosure below the air directing means; and a drive motor operatively connected to said air mover housed within said enclosure.

5. A fog generator as claimed in claim 1 wherein said air directing means includes a substantially vertical tubular portion surrounding part of said duct, and further comprising duct supporting means passing up the interior of said duct to support the duct in a manner allowing air to flow into said air directing means, and a substantially conical air deflector concentric with the duct axis to deflect air flow generated by said air mover through said air directing means.

6. A fog generator as claimed in claim 5 wherein the air directing means is supported for rotation by wheels bearing on a track provided on said air directing means.

7. A fog generator as claimed in claim 1 wherein:

said nozzle support means comprises a nozzle rack;

said plurality of nozzles are mounted on said nozzle rack; and rack mounting means is provided extending between said nozzle rack and said air directing means.

8. A fog generator as claimed in claim 1, wherein said fluid supply means comprises means to supply water under pressure to said nozzles.

9. A fog generator as claimed in claim 1 wherein said air mover comprises:
   a propeller fan mounted in said duct to rotate about an axis coaxial with the central axis of the duct; and
   a plurality of stator blades mounted downstream of said fan.

10. A method of modifying climatic conditions comprising:
   generating a substantially vertical air flow in a duct having upper and lower ends;
   directing said air flow from the lower end of the duct through an air directing element having an outlet in a substantially horizontal stream away from the duct and above the ground surface;
   rotating said air flow in a substantially horizontal plane;
   passing said horizontal air flow stream over a plurality of nozzles spaced downstream of the outlet of the air directing element after said air flow stream has emerged from the outlet of the air directing element;
   supplying fluid to said nozzles;
   ejecting said fluid through said nozzles into said air flow stream; and
   combining said ejected fluid with said air flow stream to form a substantially horizontal fog blanket.

11. A method as claimed in claim 10 further comprising, rotating the direction of the air flow through a chosen sector in a substantially horizontal plane.

12. A method as claimed in claim 11 wherein the air flow is rotated continuously through 360 degrees.

13. A method as claimed in claim 11 wherein the rotation is effected at a variable speed depending on the direction of the emergent air flow.

14. A method as claimed in claimed 11 and further comprising:
   sensing climatic conditions in the volume to be treated with fog; and
   controlling the speed of rotation of the direction of the air flow in response to the sensed climatic conditions.

15. A fog generator comprising:
   a duct having a substantially vertical axis;
   an air mover cooperatively associated with said duct to displace air through said duct;
   air directing means rotatable with respect to the ground in a substantially horizontal plane cooperatively associated with said duct and having an outlet end to direct an air stream generated by said air mover substantially horizontally away from said duct, said duct rising above said air directing means; and
   fog generating means comprising,
      a nozzle support rack disposed in spaced relationship from the outlet end of said air directing means,
      a plurality of nozzles mounted in said nozzle support rack to lie within said substantially horizontal air stream,
      nozzle support rack mounting means extending between said nozzle support rack and said air directing means, and allowing said rack to be swung downwardly from its operating position to a maintenance or storage position closer to the ground, and
      fluid supply means operatively connected to said nozzles to supply a fluid to said nozzles,
      so that the fluid emitted from said nozzles combines with said substantially horizontal air stream to form a substantially horizontal fog blanket.

16. A fog generator as claimed in claim 15 wherein said rack mounting means comprises:
   a plurality of arms extending from said rack;
   means to pivotally mount said arms on said air directing means; and
   means to counteract the moment produced by said nozzle support means about the pivot axis.

17. A fog generator as claimed in claim 16 wherein:
   said moment is a torque exerted in a vertical plane by said fog generating means; and
   said means to counteract the moment comprises means to substantially counterbalance said torque.

* * * * *